United States Patent [19]
Huff

[11] Patent Number: 5,246,195
[45] Date of Patent: Sep. 21, 1993

[54] LID HOLDER

[76] Inventor: Daniel C. Huff, 1466 E. Cherokee, Springfield, Mo. 65804

[21] Appl. No.: 844,555

[22] Filed: Mar. 2, 1992

[51] Int. Cl.⁵ ............................................... A47F 5/00
[52] U.S. Cl. ................................................. 248/309.1
[58] Field of Search ................. 248/309.1, 110, 205.1, 248/303, 304, 312.1; 211/41

[56] References Cited

U.S. PATENT DOCUMENTS

| | | | |
|---|---|---|---|
| D. 154,437 | 7/1949 | Spano | 248/110 X |
| 224,003 | 2/1880 | Drew | 248/304 |
| 424,239 | 3/1890 | Williams et al. | 248/304 |
| 494,269 | 3/1893 | Coffey | 211/30 X |
| 687,020 | 11/1901 | Hallenberg . | |
| 725,655 | 4/1903 | Beaman | 211/41 X |
| 950,522 | 3/1910 | Vough . | |
| 1,266,245 | 5/1918 | Fuhrmann . | |
| 1,528,744 | 3/1925 | Dix | 211/41 |
| 1,904,725 | 4/1933 | Gerhold | 211/41 |
| 2,634,865 | 4/1953 | Geheb | 211/41 |
| 2,662,717 | 12/1953 | Johnson | 211/41 X |
| 3,326,387 | 6/1967 | Princevalle | 211/41 |
| 3,465,892 | 9/1969 | Taylor | 211/41 |
| 4,687,169 | 8/1987 | Thomas | 248/490 |
| 4,776,469 | 10/1988 | Geleziunas | 211/41 |
| 4,850,556 | 7/1989 | Otani et al. | 248/309.1 X |
| 4,893,771 | 1/1990 | Kaneshiro | 248/176 |

Primary Examiner—Ramon O. Ramirez
Attorney, Agent, or Firm—Armstrong, Teasdale, Schlafly & Davis

[57] ABSTRACT

A lid holder is provided for attachment to a wall to securely hold a pot or pan lid while not in use. The lid holder comprises a base which is adapted to lie adjacent to the wall when the lid holder is attached to the wall. Two support members are connected to the base nd extend outward from the base. A retaining member is also connected to the base and extends outward from the base. The support members engage and support the top surface of the lid and the retaining member engages the interior lip of the lid to prevent movement of the lid away from the base. In the preferred embodiment, a shield is provided for preventing damage to the wall by the base.

20 Claims, 1 Drawing Sheet

LID HOLDER

FIELD OF THE INVENTION

This invention relates to kitchen utensils, and in particular, to a lid holder for temporarily holding the lids of pots, pans and the like.

BACKGROUND OF THE INVENTION

A common problem associated with preparing meals in a kitchen concerns placement of the lids for pots, pans, and the like, when not in use. For instance, during the preparation of meals, pots and pans are placed on the stove top, and it is often necessary to remove the lids to stir or check the temperature of the food in the pot or pan. Counter space in the kitchen adjacent to the stove is often times limited, thus making it difficult to find a place to temporarily store the lid. Further, the lid of the pot or pan typically has condensation or food on the underside. Putting the lid on the counter or kitchen table can therefore be messy.

Pot or pan lid racks have been the subject of prior patents. See for example, Geleziunas, U.S. Pat. No. 4,776,469, Geheb, U.S. Pat. No. 2,634,865, and Fuhrmann, U.S. Pat. No. 1,266,245. However, these patents are directed to storage racks for lids, and therefore do not solve the problems overcome by the present invention. For example, these patents disclose racks that are bulky and large and require a large wall space for hanging which is often times not available above or near the stove. Also, such large and bulky racks are unattractive, thus detracting from the appearance of the kitchen. Further, these racks maintain lids on steep vertical angles, and are therefore not suitable for holding lids having condensation or food on the underside of the lid because the condensation or food can slide off the lid, creating a mess. Additionally, these prior art racks cannot be removed from the wall to facilitate cleaning without removing the anchoring screws or nails which requires significant time and effort. Finally, these racks require numerous parts and are expensive to manufacture.

SUMMARY OF THE INVENTION

The lid holder of the present invention is adapted to be mounted on a vertical mounting surface, such as a kitchen wall, to securely hold a pot lid in an inverted, generally horizontal orientation while the lid is not in use. The lid holder is particularly adapted for lids having an outer surface, and an underside surface with a circumferential lip. Generally, the lid holder comprises a base, at least one support member with a support surface for supporting the outer surface of an inverted lid, and at least one retaining member with a retaining surface for engaging the lip on an inverted pot lid supported on the support surface. The lid holder preferably also comprises an attachment member to secure the lid holder to the wall.

In the preferred embodiment the base comprises a frame configured in a closed geometrical shape, having a correspondingly shaped interior area. The support members are preferably rods having proximal and distal ends and which are connected to the base at the proximal ends and extend generally perpendicularly outwardly from the base so that when the base is mounted on a vertical surface the support members extend generally horizontally in the same horizontal plane. The retaining member is preferably a rod having a proximal and distal end, connected to the base at the proximal end and extending generally perpendicularly outwardly from the base to its distal end so that when the base is mounted on a vertical surface, the retaining member extends generally horizontally in a plane vertically above the support members. The portion of the retaining member adjacent the distal end bends angularly outwardly and downwardly to be able to engage the lip on an inverted pot lid. In the preferred embodiment, the retaining member extends a shorter distance from the base than the support members extend from the base. In use, the support members engage and support the outer surface of the lid and the distal end of the retaining member engages the lip of the lid. The lid is maintained inverted in a generally horizontal position with the normally underside surface of the lid facing upwardly to minimize spillage of food and/or condensation from the under side of the lid.

In the preferred embodiment, the lid holder further comprises a shield to prevent damage to the wall by the base, the support members, or the retaining member. The shield is a flat 10 plate mounted on the base and to abut the wall when the lid holder is mounted on the wall.

An attachment member is preferably connected to the shield and has a slotted hole for removably receiving a securing device, such as a screw. Thus, the lid holder can be removed from the wall to allow the user to clean the lid holder or the wall space behind the lid holder.

Finally, in the preferred embodiment, the lid holder can include a decorative piece in the area inside the frame. The decorative piece improves the aesthetic appeal of the lid holder.

These and other features and advantages will be apparent from the following description.

BRIEF DESCRIPTION OF THE DRAWINGS

Corresponding reference numerals indicate corresponding parts throughout the several views of the drawings.

DETAILED DESCRIPTION OF THE PREFERRED EMBODIMENT

Figure 1:
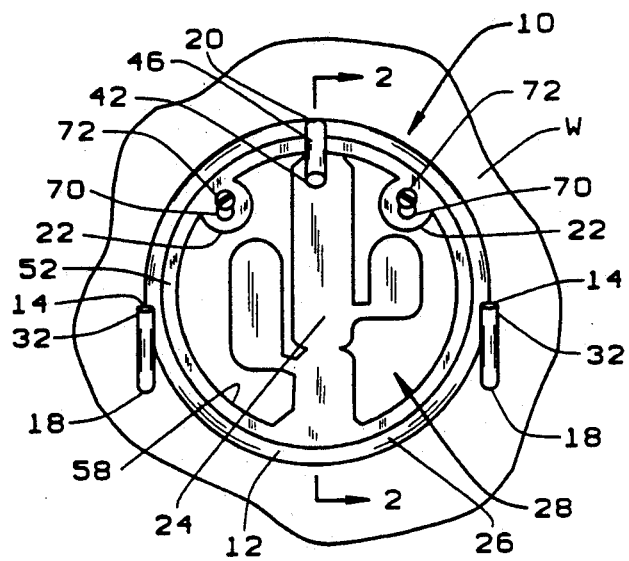
FIG. 1 is a front elevation view of a lid holder constructed according to the principles of this invention, shown as it would be mounted to a wall.
Figure 2:
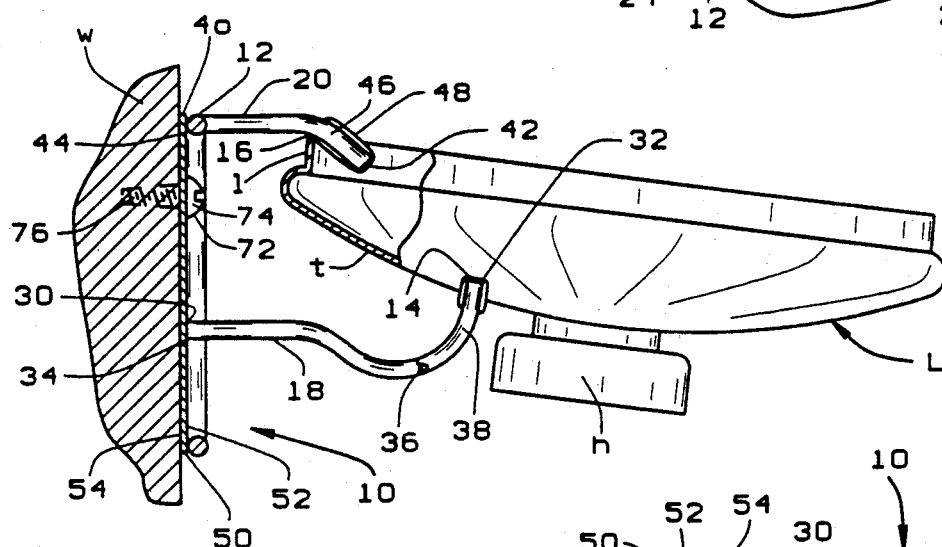
FIG. 2 is a vertical cross-sectional view taken along the plane of line 2—2 in FIG. 1.

Referring to FIGS. 1 and 2, a lid holder constructed according to the principles of this invention is designated generally as 10. The lid holder 10 is adapted to securely hold a pot lid L of the type having an interior lip 1 and a top surface t having a handle h connected thereto. The lid holder 10 is adapted to be mounted on a generally vertical mounting surface, such as a wall W, as described below. The lid holder 10 generally comprises a base 12, a support surface 14, and a retaining surface 16. The support surface 14 is preferably on one or more support members 18. The retaining surface 16 is preferably similarly on a retaining member 20. The holder 10 may also include attachment members 22, and a decorative piece 24.

The base 12 preferably comprises a frame 26 in the form of a simple, closed geometric shape, such a circle as shown in FIG. 1. The frame 26 thus defines a circular interior area 28. Of course, the frame 26 could have some other shape, such as a square or triangle, which would have a correspondingly shaped interior area. The frame 26 can be made from a circular cross-section rod bent into the desired shape.

The support members 18 have proximal ends 30 and distal ends 32. The proximal ends 30 of the support members 18 are attached to the base 12 at points 34 by welding or other suitable means. The support members 18 extend substantially perpendicularly outwardly from the base 12, oriented such that when the base is mounted on a vertical mounting surface, the support members extend generally horizontally. The portions 36 of the support members adjacent the distal ends 32 are concavely curved upwardly so that the distal ends 32 face generally upwardly from the support surface 14 for engaging the top surface of the lid L. The concave portion allows the lid L to be inserted between the support members 18 and the retaining member 20 without the top surface t of the lid L engaging the portion of the support members 18 adjacent the distal ends 32. A rubber cap or coating 38 (shown in FIG. 2) may be provided over the distal ends 32 to increase the friction between the lid L and the support members 18, and to prevent the distal ends 32 from scratching or damaging the top surface t of the lid L.

The retaining member 20 has a proximal end 40 and a distal end 42. The proximal end 40 is attached to the base 12 at point 44. The retaining member 20 extends generally perpendicularly outwardly from the base 12 such that when the base is mounted on a vertical mounting surface, the retaining member extends generally horizontally, vertically above the support members 18. The portion 46 of the retaining member adjacent the distal end 42 of the retaining member 20 is bent angularly outwardly and downwardly. A rubber cap or coating 48 may be provided over and secured to the distal end 42 of the retaining member 20. The retaining member 20 is preferably located equidistant between the support members 18 to balance the lid L on the support members 18.

The lid holder further comprises a shield 50. In this preferred embodiment, the shield is a flat plate of the same general shape as the frame 26, having a front face 52 (shown in FIG. 1) and a back face 54 (shown in FIG. 4), and an outside edge 56, and an inside edge 58 (shown best in FIG. 4). The front face 52 of the shield 50 is secured to the frame 26 such that when the lid holder 10 is secured to the wall W, the back face 54 of the shield 50 abuts the wall W to prevent contact between the base 12 and the wall W, helping to reduce damage to the wall W.

Attachment members 22 are preferably attached to the inside edge 58 of the shield 50. The attachment members have mounting holes 70 for receiving a securing device, such as a screw 72 or the like. The screws 72 comprise a head 74 and a shaft 76. The mounting holes 70 have a compound configuration with a vertically extending slot 78 and an enlarged opening 80 at the lower end of the slot 78 (shown best in FIG. 4). The slot is sized to receive the shaft 76 but not the head 74 of screw 72 so that the shaft can slide freely in the slot, but the head 74 engages the edge margins of the slot to retain the lid holder on the wall. In operation, two screws 72 are secured to the wall W spaced apart at the same height on the wall. The lid holder 10 can be securely mounted on the wall W by aligning the enlarged openings 80 of the mounting holes 70 with the two screws 72, and pushing the lid holder over the screws 72. The lid holder is then slid downwardly over the screws.

A decorative piece 24 may be attached to the inside edge 58 of the shield 50. As shown, the decorative piece 24 is a cactus figure attached to the inside edge 54 of the shield 46 at junctions 90 and 92. Of course, any other decorative design could be substituted for the cactus.

Figure 3:
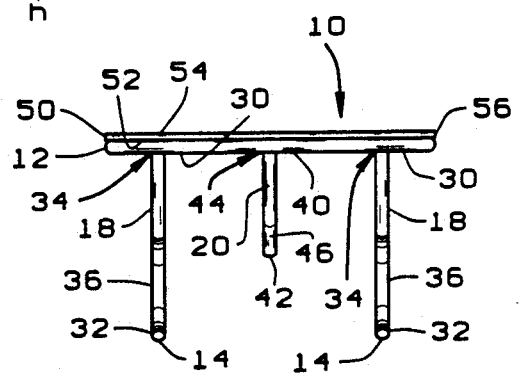
FIG. 3 is a top plan view of the lid holder.

Referring to FIG. 3, when the base 12 is mounted on a vertical surface the support members 18 extend horizontally outwardly from the base approximately two and a half inches (2.5"). The retaining member 20 extends horizontally outwardly from the base approximately one and a half inches (1.5"). The base 12 has a radius of approximately one and a half inches (1.5").

Figure 4:
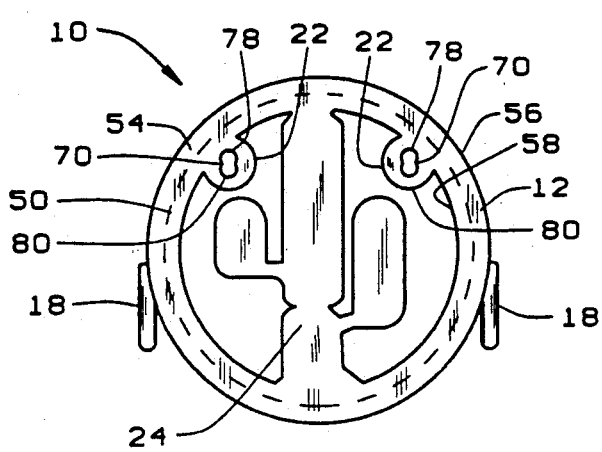
FIG. 4 is a rear elevation view of the lid holder.

The frame 26, the support members 18, and the retaining member 20 are preferably made of a metal, such as steel rod, to increase durability; however, other materials including wood and plastic could also be used. Further, as best shown in FIG. 4, the attachment members 22, the decorative piece 24, and the protection member 50 are preferably one piece, and can be conveniently made out of stamped metal. The lid holder 10 can be painted colors to protect the lid holder and improve its appearance.

OPERATION

The pot lid holder 10 is quickly and easily installed on a vertical wall or cabinet surface in the kitchen by driving two screws into the wall appropriately spaced at the same horizontal level. The enlarged openings 80 are aligned with the heads of the screws and then pushed over the heads and the lid holder is slid downwardly with the slots 78 accommodating the shafts of the screws. Once installed, the lid holder 10 is ready for use.

When, in the course of preparing a meal, it is desired to temporarily hold a pot lid L out of the way, the lid L is simply inverted to prevent any condensation or food from dripping off. The top t of the lid L is placed on the support members 18 and the lid tilted somewhat so that the lip 1 can be slid underneath the retaining member 20. The lid can then be released, and it will be held between the support and the retaining members. The bent portion 48 prevents the lip 1 from slipping from the retaining member. The lid can be easily removed from the holder by tipping it slightly and pulling it free.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limited sense.

I claim:

1. A lid holder for temporarily holding a pot lid of the type having a top with a circumferential rim, the lid holder being adapted to hold the pot lid inverted in a generally horizontal orientation and comprising:

a base adapted to be mounted to a generally vertical mounting surface;

at least one support member extending from the base, and having a support surface thereon spaced from the base and oriented such that when the base is mounted on a generally vertical mounting surface, the support surface faces generally upwardly to engage the top of an inverted pot lid;

a retaining member extending from the base, and having a retaining surface thereon spaced closer to the base than that support surface, the retaining member being oriented such that when the base is mounted on a generally vertical mounting surface, the retaining surface is located vertically above the support surface and faces generally downwardly to engage the rim of an inverted pot lid resting on the support surface.

2. The lid holder according to claim 1 comprises at least two support members, each support member having a proximal end attached to the base, and a distal end, each support member extending generally perpendicularly from the base, and wherein the support surface comprises a portion of the support members.

3. The lid holder according to claim 2 wherein the portions of the support members adjacent the distal ends are curved so that the distal ends of the support members face generally upwardly, and wherein the support surface comprises the distal ends of the support members.

4. The lid holder according to claim 3 wherein the lid holder comprises one retaining member, having a proximal end attached to the base, and a distal end, the lid holder further comprising two support members, the retaining member being located generally equidistant between the support members in a horizontal plane above the support members when the lid holder is mounted to the wall.

5. The lid holder according to claim 1 wherein the base comprises a frame in shape of a closed geometric figure.

6. A lid holder for temporarily holding a pot lid of the type having a top surface and a circumferential rim, the lid holder being adapted to connect to a generally vertical wall and to hold the pot lid inverted in a generally horizontal orientation, the lid holder comprising:

a base adapted to lie adjacent secured to the wall;

at least two support members connected to the base for engaging and supporting the top surface of the lid, the support members extending from the base;

a retaining member having a distal end and a proximal end connected to the base, the retaining member extending outwardly to the distal end, a portion of the retaining member adjacent the distal end bending angularly and outwardly downward; and attachment means for detachably securing the lid holder to the wall.

7. The lid holder of claim 6 wherein the support members extend substantially perpendicularly outward from the base in a generally horizontal plane, and the retaining member extends substantially perpendicularly outward from the base in a horizontal plane generally parallel to the horizontal plane defined by the support members.

8. The lid holder of claim 7 wherein each support member has a proximal end, a distal end, and a portion adjacent the distal end that curves concavely upward so that the distal end faces generally upward for engaging the top surface of the lid.

9. The lid holder of claim 8 wherein the retaining member extends from the base a shorter distance than the support members extend from the base.

10. The lid holder of claim 6 wherein the lid holder further comprises a shield connected to the base for preventing damage to the wall by the base.

11. The lid holder of claim 10 wherein the shield comprises a flat plate of the same general shape as the base, the shield being connected to the base such that when the lid holder is attached to the wall, the flat plate abuts the wall to prevent contact between the base and the wall.

12. The lid holder of claim 6 wherein the attachment means comprises at least one mounting hole for receiving a securing device having a head and shaft, the mounting hole having a compound configuration comprising a vertically extending slot and an enlarged opening for receiving the head of the securing device, the slot being sized to receive the shaft but not the head of the securing device.

13. The lid holder of claim 6 wherein the base comprises a frame in the form of a geometrical shape, the frame defining an interior area.

14. The lid holder of claim 13 wherein the lid holder further comprises a decorative piece connected within the interior area.

15. A lid holder for temporarily holding a pot lid of the type having a top surface and a circumferential rim, the lid holder being adapted to connect to a generally vertical wall and to hold the pot lid inverted in a generally horizontal orientation, the lid holder comprising:

a base adapted to lie adjacent the wall;

at least two support members connected to the base for engaging and supporting the top surface of the lid, the support members extending substantially perpendicularly outward from the base in generally horizontal plane;

a retaining member having a distal end and a proximal end connected to the base, the retaining member extending substantially perpendicularly outward from the base in a horizontal plane generally parallel to the horizontal plane defined by the support members, the retaining member further having a portion adjacent the distal end that bends angularly and outwardly downward; and a shield connected to the base so that the shield abuts the wall when the lid holder is secured to the wall to prevent contact between the base and the wall.

16. The lid holder of claim 15 wherein each support member has a proximal end, a distal end, and a portion adjacent the distal end that curves concavely upward so that the distal end faces generally upward for engaging the top surface of the lid.

17. The lid holder of claim 16 wherein the retaining member extends horizontally from the base approximately one and a half inches (1.5"), and the support members extend horizontally from the base approximately two and a half inches (2.5").

18. The lid holder of claim 15 wherein the lid holder further comprises attachment means, the attachment means comprising at least one mounting hole for receiving a securing device having a head and shaft, the mounting hole having a compound configuration comprising a vertically extending slot and an enlarged opening for receiving the head of the securing device, the slot being sized to receive the shaft but not the head of the securing device.

19. The lid holder of claim 15 wherein the shield comprises a flat plate of the same general shape as the base, the shield being connected to the base such that when the lid holder is attached to the wall, the flat plate abuts the wall to prevent contact between the base and the wall.

20. The lid holder of claim 15 wherein the base comprises a frame in the form of a geometrical shape, the frame defining an interior area, the lid holder further comprising a decorative figure connected to the lid holder within the inner boundary.

* * * * *